(12) United States Patent
Munholand et al.

(10) Patent No.: US 9,003,643 B2
(45) Date of Patent: Apr. 14, 2015

(54) SYSTEMS FOR STATOR BAR SHAPE TOOLING

(75) Inventors: Caleb James Munholand, Newcomerstown, OH (US); Mark Stephen Clough, Dallas, TX (US); Mark Kent Shoemaker, Newcomerstown, OH (US); David John Wardell, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 630 days.

(21) Appl. No.: 12/846,032

(22) Filed: Jul. 29, 2010

(65) Prior Publication Data

US 2012/0023736 A1 Feb. 2, 2012

(51) Int. Cl.
*B23P 19/00* (2006.01)
*H02K 15/00* (2006.01)
*B23P 15/00* (2006.01)

(52) U.S. Cl.
CPC .............. *B23P 15/00* (2013.01); *B22F 2998/00* (2013.01)

(58) Field of Classification Search
CPC ..... H02K 15/0421; H02K 3/04; H02K 1/148; Y02E 10/725
USPC ......... 29/596, 33 R, 458, 509, 524.1, 525.06, 29/592.1, 890.039, 890.04, 896.22, 732, 29/564.2, 565, 750, 758; 72/375, 435, 72/441, 446, 448; 81/19, 25; 264/113, 264/125, 493, 642
See application file for complete search history.

(56) References Cited

U.S. PATENT DOCUMENTS

| 1,823,016 | A | * | 9/1931 | Widman | 81/19 |
| 4,385,254 | A | | 5/1983 | Vakser et al. | |
| 4,863,538 | A | * | 9/1989 | Deckard | 264/497 |
| 6,703,752 | B2 | | 3/2004 | Haldemann | |
| 6,710,496 | B2 | * | 3/2004 | Fujita et al. | 310/201 |
| 7,331,207 | B2 | * | 2/2008 | Borgwarth | 72/448 |

* cited by examiner

*Primary Examiner* — Thiem Phan
(74) *Attorney, Agent, or Firm* — Sutherland Asbill & Brennan LLP

(57) ABSTRACT

Certain embodiments of the invention may include systems for providing stator bar shape tooling. According to an example embodiment of the invention, a system for shaping an element is provided. The system includes tooling that having at least one constraining surface that is fabricated at least in part by selective laser sintering, where the at least one constraining surface includes at least one curved element section to facilitate bending of at least a portion of an element around the at least one curved element section.

7 Claims, 4 Drawing Sheets

SYSTEMS FOR STATOR BAR SHAPE TOOLING

RELATED APPLICATIONS

This application is related to application Ser. No. 12/846,018, filed concurrently with the present application on Jul. 29, 2010, entitled: "Systems and Methods for Stator Bar Press Tooling," the content of which is hereby incorporated by reference in its entirety.

FIELD OF THE INVENTION

This invention generally relates to tooling, and in particular, to stator bar shape tooling.

BACKGROUND OF THE INVENTION

A stator is a stationary part of an electric machine, such as a generator or motor. In a generator, current can be induced in the stator coils by the influence of the rotor's rotating field coils. A stator coil in a small electric machine can be made from wire coils that are wrapped in an arrangement to form a cylindrical frame for surrounding the rotor. The wire is usually coated with an insulating lacquer so that adjacent coil windings do not short circuit with one another. In large industrial generators, however, the stator winding must carry a large amount of current, and are therefore, usually made from elongated bars of copper, for example. The stator bars are bent or formed into specific, complex shapes, and multiple pairs of approximately mirror-imaged stator bars usually are arranged in a cylindrical array and electrically connected to create loops for which the rotor field coil can induce currents. One of the challenges in building or refurbishing an electrical generator is the bending or forming of the stator bars into the correct shape so that the array can be assembled quickly, and so that the correct spacing tolerance is maintained between each of the stator bars.

Stator bars can be subject to high voltage potentials during the operation of the electric machine, and may arc under certain conditions. Arcing is a particular problem in certain sections of the stator bar, particularly where the stator bar is bent and where high electric field strengths are present. Insulation material can be utilized to wrap or coat the stator bars to allow the stator to be run at higher potentials without arcing. However, small gaps, bubbles, and/or imperfections in the insulation can reduce the effective dielectric constant of the insulation and lead to arcing, damage, and failure of the stator bar and electrical machinery.

BRIEF SUMMARY OF THE INVENTION

Some or all of the above needs may be addressed by certain embodiments of the invention. Certain embodiments of the invention may include systems and methods for providing stator bar shape tooling.

According to an example embodiment of the invention, a method is provided for shaping an element. The method can include providing at least one constraining surface, wherein the at least one constraining surface is fabricated at least in part by selective laser sintering. The method can include deforming an element with the at least one constraining surface to define at least an external shape of a formed element.

According to another example embodiment, a system is provided for shaping an element. The system can include tooling that can include at least one constraining surface, wherein the at least one constraining surface is fabricated at least in part by selective laser sintering. The system can also include a hammer device operable to force and deform an element, wherein the at least one constraining surface of the tooling defines at least an external shape of a formed element.

According to another example embodiment, a method is provided for manufacturing shape tooling. The method includes fabricating at least one constraining surface operable to deform an element, wherein the at least one constraining surface is fabricated at least in part by selective laser sintering.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the inventions may enable tooling to be made for shaping elements. According to certain example embodiments, the tooling may include constraining surfaces having shapes designed and manufactured using rapid prototyping methods, including laser sintering based on three-dimensional computer modeling. In certain example embodiments of the invention, custom constraining surfaces may be produced with accuracy, repeatability, and speed. In certain example embodiments, the constraining surfaces may provide a shaping surface for bending or forming stock material (for example, a copper bar) into a stator bar for use in electrical machinery.

According to example embodiments of the inventions, various tooling for shaping an element or for pressing an insulating material onto a shaped element will now be described with reference to the accompanying figures.

Figure 1:
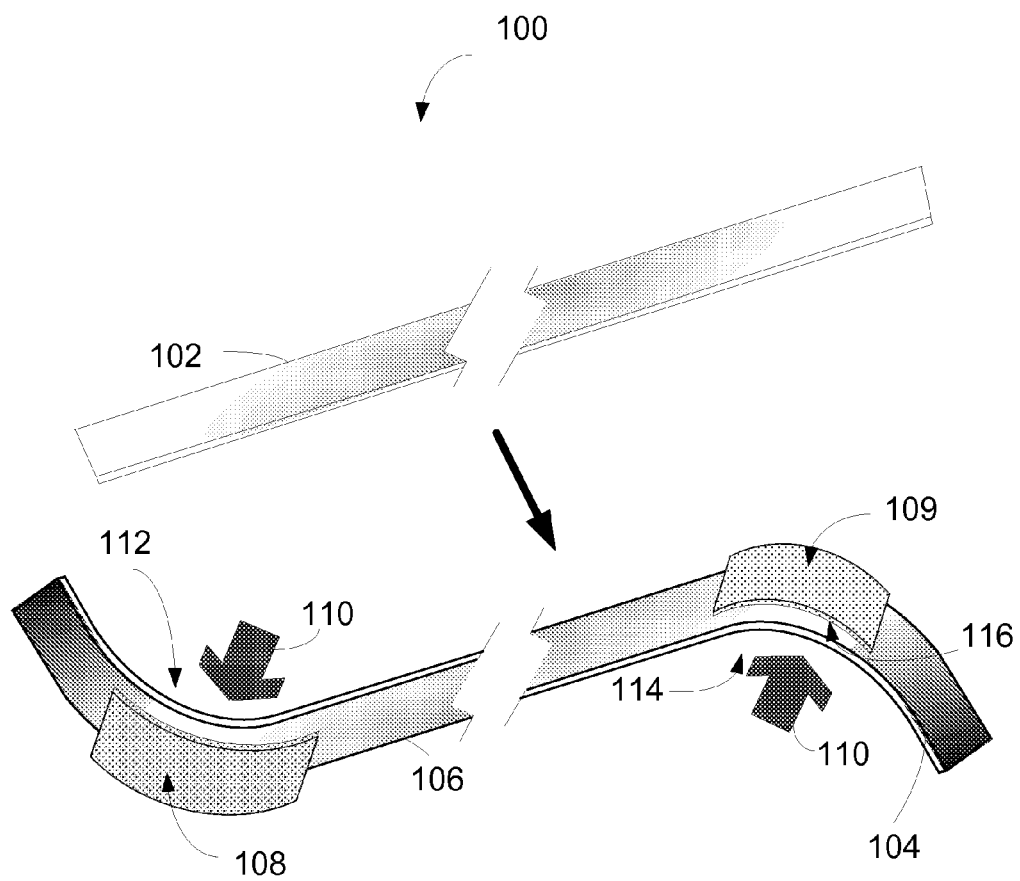
FIG. 1 is a pictorial diagram of illustrative shape tooling according to an example embodiment of the invention.

FIG. 1 illustrates an example pictorial diagram of shape tooling 100 according to an example embodiment of the invention. The shape tooling 100 may be utilized for shaping an element 102 (such as stock material) into a formed element 104 such as a stator bar. According to an example embodiment, the element 102 may be a metal such as copper, nickel, steel, or a metallic alloy. According to an example embodiment, the shape tooling 100 may include one or more curved sections 108, 109 to facilitate the bending or shaping of the element 102. In an example embodiment, the shape tooling 100 may include a first curved section 108 having a first constraining surface 106. In an example embodiment, the shape tooling 100 may include a second curved section 109 having a second constraining surface 116. According to an embodiment of the invention, a shaping hammer 110 made of rubber, wood, metal or other suitable material may be utilized to shape, deform, or define the element 102 to have one or more curved element sections 112, 114 corresponding to the shape of the constraining surfaces 106, 116. In an example embodiment, the element 102 may be deformed with at least one constraining surface 106, 116 to define at least an external shape of a formed element 104.

In certain example embodiments, at least the constraining surfaces 106, 116 of the curved sections 108, 109 may be fabricated using rapid prototyping techniques such as selective laser sintering. For example, selective laser sintering may include fusing together a material by laser scanning cross-sections of powdered material (metal powder and/or a polymer binder) in a pattern generated from a three dimensional digital representation of the at least one constraining surface 106, 116. In certain example embodiments, some or all of the curved sections 108, 109 may be fabricated using rapid prototyping techniques. According to example embodiments of the invention, elements 102 may be shaped with at least a curved element section 112, 114 corresponding to at least a portion of the at least one constraining surface 106, 116. The constraining surface 106, 116 may correspond to a pattern generated, for example, from a three dimensional digital representation of the at least one constraining surface 106, 116.

According to an example embodiment, the element 102 may be shaped or formed with at least a first curved element section 112 and a second curved element section 114. The first curved element section 112 may correspond to at least a portion of the at least one constraining surface 106, and the second curved element section 114 may correspond to at least a portion of a second constraining surface 116. In an example embodiment of the invention, a first constraining surface 106 and a second constraining surface 116 correspond to respective patterns generated from, for instance, three-dimensional digital representations of the first constraining surface 106 and the second constraining surface 116.

According to example embodiments of the invention, the tooling curved sections 108, 109 and constraining surfaces 106, 116 are operable for shaping an element 102 into a formed element 104 associated with a generator. The formed element 104 may include at least one of a stator bar, a stator coil, a buss bar, or a connection ring. In certain example embodiments, the element is made of copper 102. In an example embodiment, at least the constraining surface 106, 116 or the curved section 108, 109 of the tooling are operable for mounting to a tooling frame. According to an example embodiment, the constraining surface 106, 116 is operable to retain its shape while forcing and deforming the element 102 against the tooling.

Figure 2:
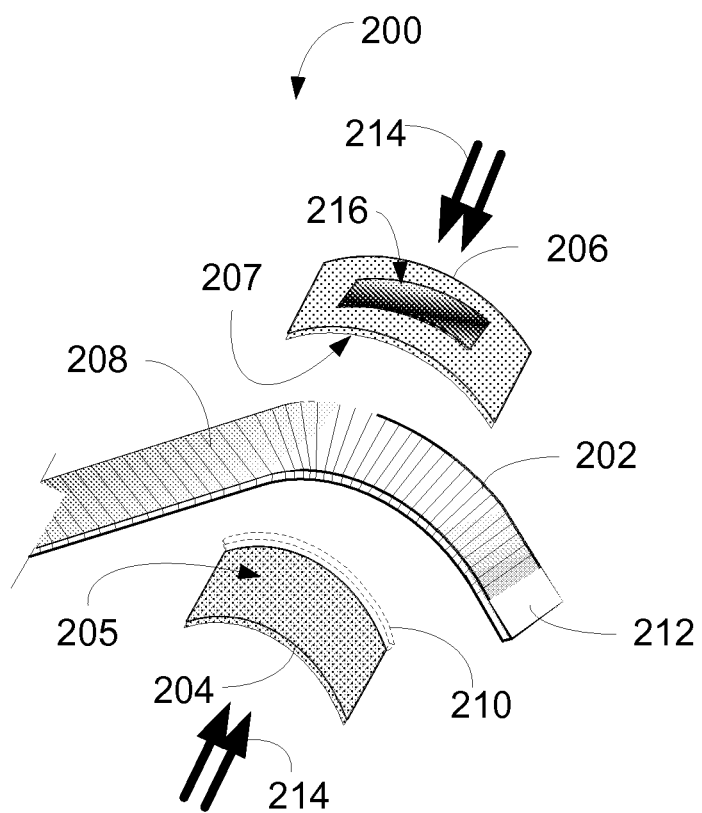
FIG. 2 is a pictorial diagram of illustrative press tooling according to an example embodiment of the invention.

FIG. 2 is a pictorial diagram of illustrative press tooling 200 according to an example embodiment of the invention. According to an example embodiment of the invention, the press tooling 200 may include an inner press 204 and an outer press 206. In an example embodiment, the inner press may include an associated inner press surface 205 having a curvature that corresponds to the curvature of a shaped element 202. Likewise, the outer press 206 may include an outer press surface 207 having a curvature that corresponds to the curvature of the shaped element 202. In an example embodiment of the invention, the shaped element 202 may be a stator bar, a stator coil, a buss bar, or a connection ring.

In an example embodiment of the invention, the shaped element 202 may be covered or wrapped in an insulating material 208 such as mica tape. In an example embodiment, the insulating material 208 may include additional materials such as polyester, a glass backing for strength, mica for dielectric resistance, and epoxy or heat activated adhesive, that when heated, may flow between and around the insulating material 208 and the shaped element 202. In certain example embodiments, the inner press 204 and outer press 206 may be utilized to apply pressure to the insulting material 208 surrounding the shaped element 212. In certain example embodiments, the inner press 204 and/or the outer press 206 may include one or more heaters 216 in thermal communication with the press surfaces 205, 207 for heating and/or curing the insulation material 208 while applying pressure to the insulting material 208 and shaped element 212.

According to an example embodiment, the inner press 204 and/or the outer press 206 may include an optional press lip 210 to constrain one or more edges of the shaped element 202 while aligning, pressing and/or heating the insulating material 208 against the shaped element 202. In certain example embodiments of the invention, a press actuator 214 may be in contact with the outer press 206 and/or the inner press 204, and may be utilized to apply pressure to the insulating material 208. In an example embodiment, the insulating material may be pressed by pressing the shaped element 212 between the inner press 204 and the outer press 206. In other example embodiments, one of the outer press 206 or the inner press 204 may be attached to a stationary frame while the other press is connected to the press actuator 211 so that only one press actuator is used.

According to example embodiments of the invention, at least an inner press surface 205 associated with the inner press 204 and an outer press surface 207 associated with the outer press 206 are fabricated at least in part by sintering. For example, selective laser sintering may include fusing together a material by laser scanning cross-sections of powdered material (metal powder and/or a polymer binder) in a pattern generated from a three dimensional digital representation of at least a portion of the press 204, 206 and/or press surface 205, 207.

Certain embodiments of the invention include tooling for applying at least one of pressure or heat to insulation material 208 in contact with a shaped element 202. For example, the inner press surface 205 and the outer press surface 207 of the tooling 204, 206 may conform to least an external portion of the shaped element 202. According to example embodiments, the shaped element 202 may be associated with a generator and may include at least one of a stator bar, a stator coil, a buss bar, or a connection ring. In example embodiments, the inner press 204 and the outer press 206 may include at least a curved surface.

Figure 3:
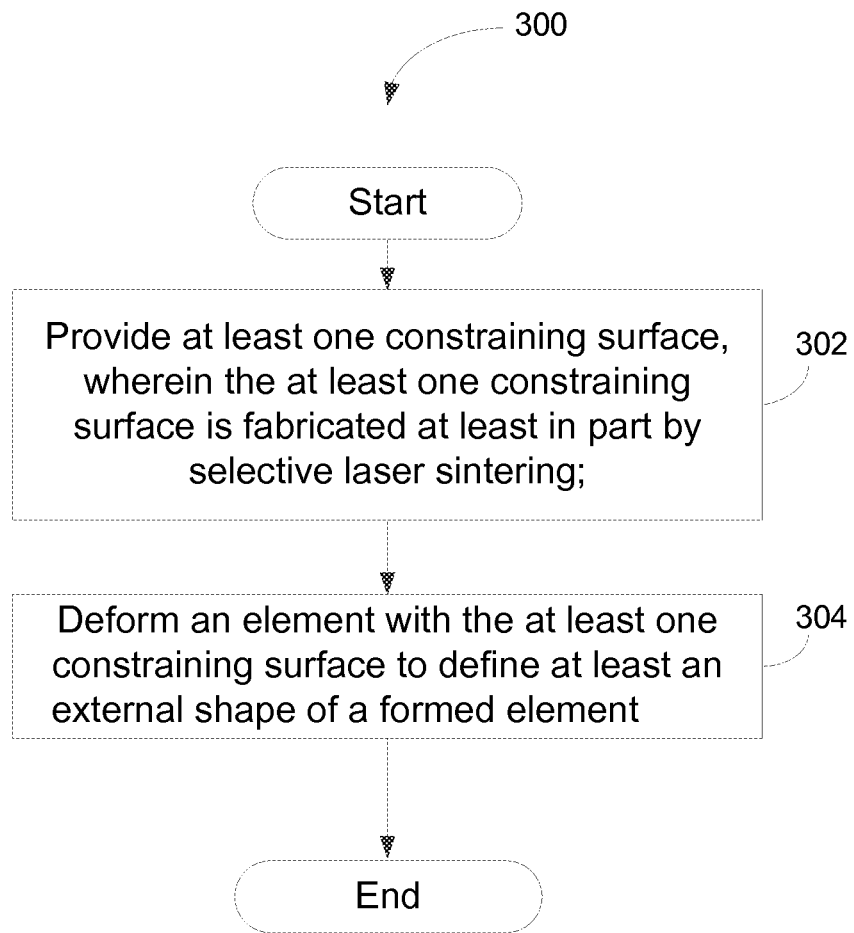
FIG. 3 is a flow diagram of an example method according to an example embodiment of the invention.

An example method 300 for shaping an element will now be described with reference to the flowchart of FIG. 3. The method 300 starts in block 302 and may include providing at least one constraining surface, where the at least one constraining surface is fabricated at least in part by selective laser sintering. In block 304, the method 300 includes deforming an element with the at least one constraining surface to define at least an external shape of a formed element. The method 300 ends after block 304.

Figure 4:
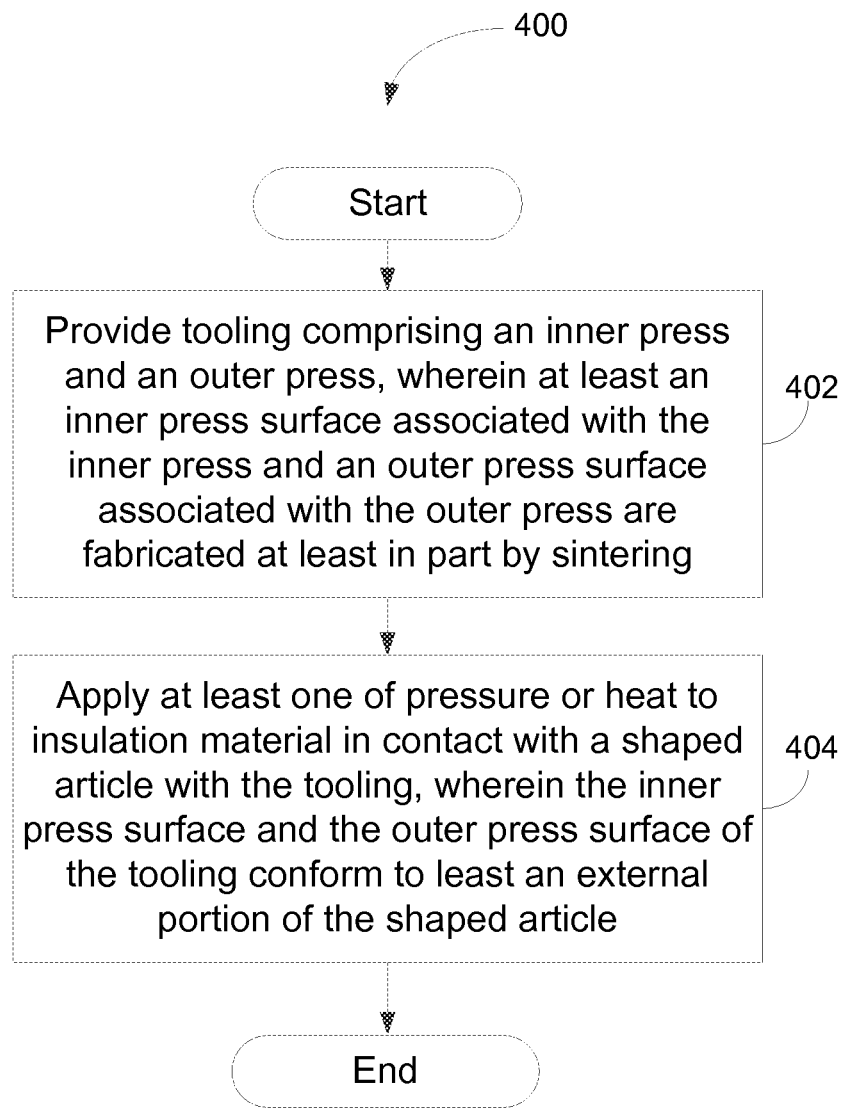
FIG. 4 is a flow diagram of another example method according to an example embodiment of the invention.

An example method 400 for pressing and curing insulation material on a shaped element will now be described with reference to the flowchart of FIG. 4. The method 400 starts in block 402 and may include providing tooling including an inner press and an outer press, wherein at least an inner press surface associated with the inner press, and an outer press surface associated with the outer press, are fabricated at least in part by sintering. In block 404, the method 400 includes applying at least one of pressure or heat to insulation material in contact with a shaped element with the tooling, wherein the inner press surface and the outer press surface of the tooling conform to least an external portion of the shaped element. The method 400 ends after block 404.

Accordingly, example embodiments of the invention can provide the technical effects of creating certain systems and methods that provide rapid production of tools for shaping elements. Example embodiments of the invention can provide the further technical effects of providing systems and methods for providing accurate constraining surfaces for shaping elements such as stator bars.

In example embodiments of the invention, the shape tooling 100 and the press tooling 200 may include additional hardware that can enable the manufacturing and use of the tooling. As desired, embodiments of the shape tooling 100 and the press tooling 200 may include more or less of the components illustrated in FIGS. 1 and 2.

The invention is described above with reference to block and flow diagrams of systems and methods, according to example embodiments of the invention. It will be understood that some blocks of the block diagrams and flow diagrams may not necessarily need to be performed in the order presented, or may not necessarily need to be performed at all, according to some embodiments of the invention.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A system for shaping an element, comprising:
    tooling for shaping an element into a formed element, wherein the formed element comprises at least one of a stator bar, a stator coil, a buss bar, or a connection ring, and wherein the tooling comprises two constraining surfaces fabricated at least in part by selective laser sintering, and wherein the two constraining surfaces each comprises at least one curved element section for bending at least a portion of the element around the at least one curved element section, and wherein the tooling further comprises one or more heaters in thermal communication with the two constraining surfaces for applying heat around the formed element.

2. The system of claim 1, wherein the at least one of the two constraining surfaces correspond to a pattern generated from a three dimensional digital representation of the tooling.

3. The system of claim 1, wherein selective laser sintering comprises fusing together a material comprising at least one of a metal powder or a polymer binder.

4. The system of claim 1, wherein the formed element is associated with a generator.

5. The system of claim 1, wherein the element comprises copper.

6. The system of claim 1, wherein at least one of the two constraining surfaces is operable to mount to a tooling frame.

7. The system of claim 1, wherein at least one of the two constraining surfaces is operable to retain its shape while forcing and deforming the element against the tooling.

* * * * *